(12) United States Patent
Liang et al.

(10) Patent No.: US 9,485,454 B1
(45) Date of Patent: Nov. 1, 2016

(54) DISPLAY DEVICE AND METHOD FOR PROCESSING VIDEO SIGNAL

(71) Applicant: VIA Alliance Semiconductor Co., Ltd., Shanghai (CN)

(72) Inventors: Aimin Liang, Beijing (CN); Han Wang, Beijing (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 0 days.

(21) Appl. No.: 14/974,237

(22) Filed: Dec. 18, 2015

(30) Foreign Application Priority Data

Sep. 25, 2015 (CN) .......................... 2015 1 0621246

(51) Int. Cl.
*H04N 7/01* (2006.01)
*H04N 19/70* (2014.01)

(52) U.S. Cl.
CPC ................ *H04N 7/01* (2013.01); *H04N 19/70* (2014.11)

(58) Field of Classification Search
CPC ...... H04N 7/01; H04N 7/012; H04N 7/0115; H04N 7/0112
USPC .......................... 348/441, 446, 448, 458, 459
IPC ........................................................ H04N 7/01
See application file for complete search history.

(56) References Cited

U.S. PATENT DOCUMENTS

| 5,187,575 A | * | 2/1993 | Lim | .......................... H04N 5/46 348/555 |
| 6,058,140 A | * | 5/2000 | Smolenski | ............. H04N 19/51 348/452 |

* cited by examiner

*Primary Examiner* — Sherrie Hsia
(74) *Attorney, Agent, or Firm* — McClure, Qualey & Rodack, LLP

(57) ABSTRACT

A display device, configured to receive a video signal including a plurality of frames having an odd field and an even field, including a processor and a display module. The processor performs the following steps: respectively determining whether the odd fields and the even fields of each current frame and its previous frame are similar; generating a first pattern, a second pattern, a third pattern, or a fourth pattern corresponding to the current frame according to a determining result; accumulating the first patterns, the second patterns, the third patterns, and the fourth patterns in a first cycle; determining whether the video signal is a video converted from film according to the accumulations; generating output frames according to the pattern of each current frame when the video signal is the video converted from film. The display module displays the output frames by progressive scanning.

20 Claims, 3 Drawing Sheets

DISPLAY DEVICE AND METHOD FOR PROCESSING VIDEO SIGNAL

CROSS REFERENCE TO RELATED APPLICATIONS

This Application claims priority of China Patent Application No. 201510621246.5, filed on Sep. 25, 2015, the entirety of which is incorporated by reference herein.

BACKGROUND OF THE INVENTION

1. Field of the Invention

The application relates in general to a display device and a method for processing a video signal, and in particular to a display device and a method for processing a video signal which are arranged to determine a source of a video signal by accumulating patterns generated by two adjacent frames.

2. Description of the Related Art

In general, display devices such as LCD monitors, plasma display devices, and video projectors can receive two different types of video signals: video converted from film, and normal video shot by a common digital camera. Video converted from film is composed of frames, whereas normal video is composed of fields, and two adjacent fields form a frame. Furthermore, the playback rates of video converted from film and normal video are also different. In order to play a film which is composed of frames on an average display device, a "PullDown" process must be used to convert the film frames to video frames by separating the film frames into two interlacing fields. As shown in FIG. 1, the film frame A is separated into field A1 and field A2; film frame B is separated into field B1 and field B2; film frame C is separated into field C1 and field C2; film frame D is separated into field D1 and D2; and so on. Hereafter, frame A is copied for generating field A3, frame B is not copied, frame C is copied for generating field C3, frame D is not copied, and so on. Then the video fields A1, A2, A3, B1, B2, C1, C2, C3, D1, D2, . . . , are generated by the cadence of 3:2:3:2. Also, the fields of a video frame can be generated by other cadences, such as a cadence of 3:2:3:2:2, a cadence of 2:2, or a cadence of 6:4. Using the cadence of 3:2 as an example, the first frame is composed of the field A1 and the field A2, the second frame is composed of the field A3 and the field B1, the third frame is composed of the field B2 and the field C1, the fourth frame is composed of the field C2 and the field C3, the fifth frame is composed of the field D1 and the field D2, and so on. This kind of video frame is able to play on the display device which uses the interlaced scanning, because the display device which uses the interlaced scanning will not display two fields of one frame at the same time. However, it will be a problem when this kind of video frame plays on the display device which only supports the progressive scanning. Because the second frame of the video converted from film is composed of the field A3 and the field B1 which come from different scenes, thus they are unable to be combined with each other. Therefore, after receiving the video frame, the type of the video signal must be determined first, such as determining whether the video signal is a normal video signal or a video converted from film. If the video signal is a video converted from film, the cadence of the video frame must also be determined for further processing with a reverse PullDown to make it able to be played correctly on the display device supporting the progressive scanning. In the prior art, for determining the cadence of the video signal, nine frames of the video signal must be read first for obtaining the patterns of 16 bits, then the corresponding patterns are searched in a table for determining the cadence of the video signal. If the patterns cannot be found in the table, the video signal is determined as a normal video signal rather than a video converted from film. However, when the table does not include the types of patterns that correspond to all types of cadence, or an error occurs when obtaining the patterns of the video signal, the type and cadence of the video signal are unable to be determined correctly. Thus, how to easily and correctly determine the type and the cadence of the video signal is a problem which needs to be solved immediately.

BRIEF SUMMARY OF INVENTION

An embodiment of the present invention provides a display device, configured to receive a video signal, wherein the video signal comprises a plurality of frames, and each frame has an odd field and an even field. The display device comprises a processor and a display module. The processor, configured to perform the following steps: respectively determining whether the odd fields of each current frame and its previous frame are similar and the even fields of each current frame and its previous frame are similar; generating one of a plurality of patterns corresponding to each current frame according to a determining result by determining whether the odd fields of each current frame and its previous frame are similar and the even fields of each current frame and its previous frame are similar, wherein the patterns at least include a first pattern, a second pattern, a third pattern, and a fourth pattern; respectively accumulating the first patterns, the second patterns, the third patterns, and the fourth patterns in a first cycle; determining whether the video signal is a video converted from film according to the number of first patterns and second patterns, or the number of fourth patterns; generating a plurality of output frames by processing the previous frame, the current frame and a subsequent frame according to the pattern of each current frame when the video signal is a video converted from film; and a display module, configured to display the output frames by progressive scanning.

Another embodiment of the present invention provides a method for processing a video signal, adapted to a display device, comprising: generating a video signal, wherein the video signal comprises a plurality of frames, and each frame has an odd field and an even field; respectively determining whether the odd fields of each current frame and its previous frame are similar and the even fields of each current frame and its previous frame are similar; generating one of a plurality of patterns corresponding to each current frame according to a determining result by determining whether the odd fields of each current frame and its previous frame are similar and the even fields of each current frame and its previous frame are similar, wherein the patterns at least include a first pattern, a second pattern, a third pattern, and a fourth pattern; respectively accumulating the first patterns, the second patterns, the third patterns, and the fourth patterns in a first cycle; determining whether the video signal is a video converted from film according to the number of first patterns and second patterns, or the number of fourth patterns; generating a plurality of output frames by processing the previous frame, the current frame and a subsequent frame according to the pattern of each current frame when the video signal is a video converted from film; and displaying the output frames by progressive scanning.

The display device and the method for processing a video signal of the present invention determines the type of the video signal by appropriately accumulating different patterns generated by two adjacent frames, and processes the reverse PullDown according to the type of the video signal. In addition, the complicated steps for building a table can be simplified, and misjudgments caused by an incomplete table or errors in the video signal can be avoided, so that better video playback can be provided to users.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Further areas to which the present systems and methods can be applied will become apparent from the detailed description provided herein. It should be understood that the detailed description and specific examples, while indicating exemplary embodiments of the contrast enhancement apparatus and method, are intended for the purposes of illustration only and are not intended to limit the scope of the invention.

Figure 1:
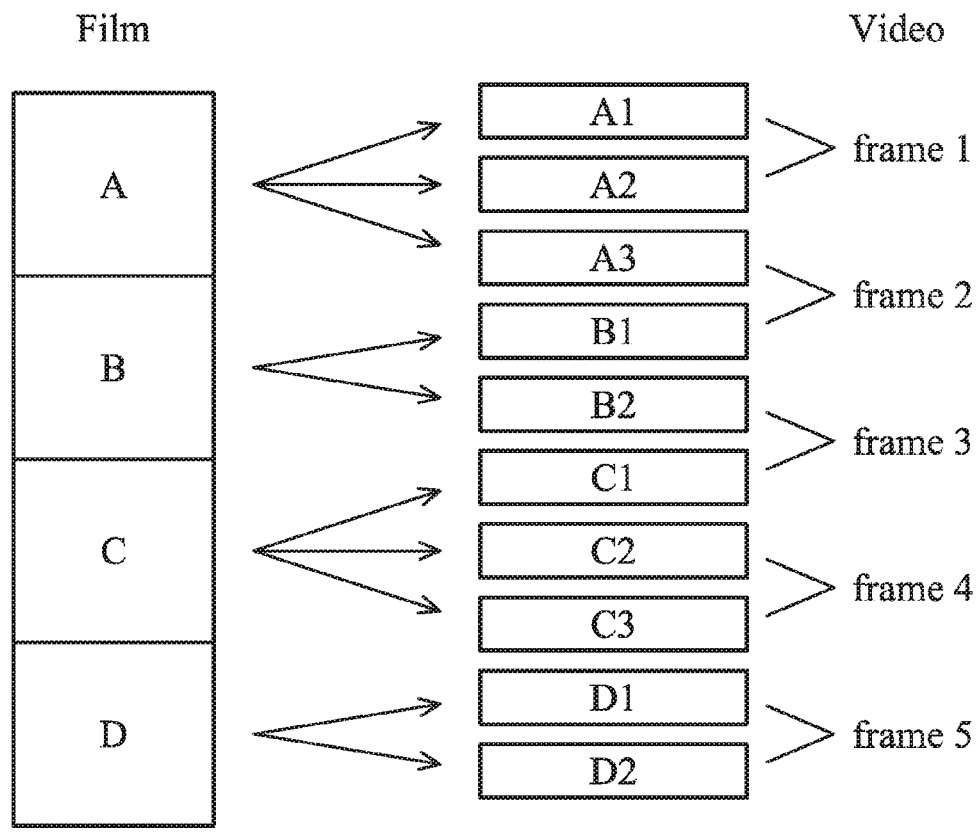
FIG. 1 is a schematic diagram of a Pull-Down process in accordance with the prior art.
Figure 2:
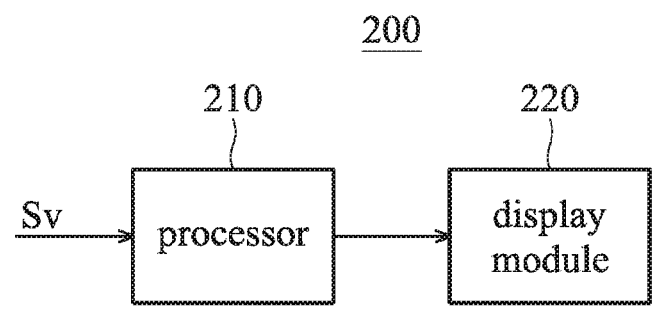
FIG. 2 is a schematic diagram of a display device in accordance with an embodiment of the invention.

FIG. 2 is a schematic diagram of a display device in accordance with an embodiment of the invention. As shown in FIG. 2, the display device 200 includes the processor 210 and the display module 220. The processor 210 can be a microprocessor or a GPU, etc. The display module 220 can be a TFT-LCD or a plasma display, etc. The processor 210 receives the video signal Sv, obtains a plurality of patterns according to the field-difference between the odd fields of two adjacent frames and the field-difference between the even fields of two adjacent frames, i.e. each current frame and its previous frame. The processor 210 further determines whether the video signal Sv is the video converted from film according to the numbers of corresponding patterns, and outputs a plurality of frames by performing the reverse PullDown on the current frame, the previous frame and the subsequent frame according to different patterns corresponding to each current frame, so that the output frames can be played correctly on a display device which uses progressive scanning. The display module 220 plays the output frames processed with the reverse PullDown by using progressive scanning.

odd field and an even field. In the embodiment, the input frame 0-7 are the frames which converted by the 3v2 PullDown. The 3v2 PullDown is the program that converts the film frame which has 24 frames per second to the video frame which has 60 frames per second. According to the 3v2 PullDown program, the odd field $B_o$ of the input frame 2 is the copy field of the odd field $B_o$ of the input frame 1, the even field $D_e$ of the input frame 3 is the copy field of the even field $D_e$ of the input frame 4. The pattern of 2 bits can be obtained according to the field-difference corresponding to the odd field and the field-difference corresponding to the even field of each current frame and its previous frame. When the odd field/even field of the current frame and the previous frame are similar, the field-label can be set to "1". Otherwise, when the odd field/even field of the current frame and the previous frame are different, the field-label can be set to "0". In the implementation, if the field-difference of the odd fields of the adjacent frames is 2 times or more of the field-difference of the even field, which means the field-difference of the even fields is smaller, the pattern of the current frame is "01". Otherwise, if the field-difference of the even field of the adjacent frames is 2 times or more of the field-difference of the odd field, which means the field-difference of the odd fields is smaller, the pattern of the current frame is "10". And if both of the conditions are not met, the pattern of the current frame is "00". Using input frame 2 as the current frame as an example, because the odd field $B_o$ of the input frame 2 is the copy frame of the odd field $B_o$ of the input frame 1 (the previous input frame), the odd fields are similar. Because the even field $B_e$ of the input frame 1 and the even field $C_e$ of the input frame 2 are corresponding to different time points of the film frame, the even fields are different. According to the comparing result, the pattern of the input frame 2 is the "10" pattern. Furthermore, using input frame 4 as the current frame as an example, the odd field $D_o$ of input frame 4 and the odd field $C_o$ of input frame 3 (the previous input frame) are different, thus the field-label is set to "0". The even field $D_e$ of the input frame 4 and the even field $D_e$ of the previous input frame 3 are similar, thus the field-label of the even field is set to "1". According to the comparing result, the pattern of the input frame 4 is the "01" pattern. Furthermore, when the odd field and the even field of the current frame and the previous frame are different, i.e. the "00" pattern, the processor divides the "00" pattern into two different types of patterns. When the "00" pattern appears after the "10" pattern and before the "01" pattern, the pattern is set to a "00_merge" pattern, the "00_m" shown in Table 1. Otherwise, when the "00" pattern appears after the "01" pattern and before the "10" pattern, the pattern is set to a "00_copy" pattern, the "00_c" pattern as shown in Table 1.

TABLE 1

| input frame | 0 | | 1 | | 2 | | 3 | | 4 | | 5 | | 6 | | 7 | |
|---|---|---|---|---|---|---|---|---|---|---|---|---|---|---|---|---|
| | $A_o$ | $A_e$ | $B_o$ | $B_e$ | $B_o$ | $C_e$ | $C_o$ | $D_e$ | $D_o$ | $D_e$ | $E_o$ | $E_e$ | $F_o$ | $F_e$ | $F_o$ | $G_e$ |
| pattern | 00 | | 10 | | 00_m | | 01 | | 00_c | | 00_c | | 10 | | | |
| output frame | | | $B_o$ $B_e$ | | $C_o$ $C_e$ | | $C_o$ $C_e$ | | $D_o$ $D_e$ | | $D_o$ $D_e$ | | $D_o$ $D_e$ | | $E_o$ $E_e$ | | $E_o$ $E_e$ | | $F_o$ $F_e$ | | $F_o$ $F_e$ |

Table 1 is the schematic diagram of the video signal in accordance with an embodiment of the invention. As shown in Table 1, input frame 0-7 represent the input frame corresponding to different time points. Each frame has an When the processor 210 receives the video signal $S_v$, the processor 210 determines whether the pattern of two adjacent frames is a particular pattern, which means whether the pattern is the starting pattern corresponding to one of the conversion types. For example, in the embodiment, the processor 210 determines whether the video signal $S_v$ is a film frame video signal converted by the 3v2 PullDown program. Because the pattern corresponding to the first two frames of the video signal converted by the 3v2 PullDown program is "10" pattern, thus the processor 210 determines whether the pattern of two adjacent frames of the video signal Sv is the "10" pattern. When the "10" pattern is detected, the processor 210 goes to the detect mode, which means the video signal might be the film frame video signal converted by the 3v2 PullDown program. It should be noted that the cadence of 3v2 PullDown program includes 3:2:3: 2:2, 3:2, 5:5, and 8:7, etc., but it is not limited thereto.

When the processor 210 goes to the detect mode, the process 210 accumulates each pattern in a predetermined cycle, such as 10 frames, for determining whether the video frame $S_v$ is a film frame video signal converted by the 3v2 PullDown program. In the embodiment, when the number of "00_copy" patterns is greater than a first predetermined value, e.g. 2, or the total number of "10" pattern and the "01" pattern is greater than or equal to a second predetermined value, e.g. 3, the processor 210 determines that the video signal $S_v$ is a film frame video signal converted by the 3v2 PullDown program, and then the processor 210 goes to a processing mode. In the processing mode, the processor 210 process the reverse PullDown on the video signal Sv. It should be noted that the first predetermined value and the second predetermined value can be set according to the user's particular needs, and it is not limited thereto.

It should be noted that in the detect mode, when the processor 210 determines that the video signal $S_v$ is not a film frame video signal converted by the PullDown program, the processor 210 processes the video signal $S_v$ by using a deinterlacing program.

When in the processing mode, the previous frame, the current frame, and the subsequent frame are processed by the processor 210 according to the patterns generated by each current frame for generating the output frames to the display module. In the embodiment, when the pattern of the current frame and the previous frame is the "10" pattern or the "00_merge" pattern, the processor 210 executes a frame_merge program according to the previous frame, the current frame, and the subsequent frame for generating two output frames. When the pattern of the current frame and the previous frame is the "01" pattern or the "00_copy" pattern, the processor 210 executes a frame_copy program according to the previous frame, the current frame, and the subsequent frame for generating two output frames. For example, as shown in Table 1, when the current frame is the input frame 2 and the previous frame is the input frame 1, the pattern of the current frame is "10" pattern. Then the processor 210 executes the frame_merge program according to the previous frame (input frame 1), the current frame (input frame 2), and the subsequent frame (input frame 3), which means taking the odd field $B_o$ of the current frame 2 as the odd field of the output frame, taking the even field $B_e$ of the previous frame 1 as the even field of the output frame, taking the odd field $C_o$ of the subsequent frame 3 as the odd field of another output frame, and taking the even field $C_e$ of the current frame 2 as the even field of another output frame. Then the processor 210 outputs the output frames ($B_oB_e$ and $C_oC_e$) to the display module 220. Otherwise, when the current frame is the input frame 4 and the previous frame is the input frame 3, the pattern of the current frame is "01" pattern. Then the processor 210 executes the frame_copy program by taking the current frame 4 as the output frames, and outputs the same output frames ($D_oD_e$ and $D_oD_e$) to the display module 220.

In addition, when executing the frame_merge program or the frame_copy program, the processor 210 respectively accumulates the "00_merge" patterns and the "00_copy" patterns at the same time for determining whether the video signal conforms to the conversion type determined by the detect mode. For example, when the processor 210 generates the "10" pattern according to the previous frame and the current frame and executes the frame_merge program, the processor 210 accumulates the continuously appearing "00_merge" patterns and the "00_copy" patterns at the same time. If the number of "00_merge" patterns which appear continuously and the "00_copy" patterns which appear continuously is greater than 4, which means there are four "00_merge" patterns or "00_copy" patterns appearing continuously, the processor 210 determines that an error appeared in the video signal $S_v$ or the conversion type has changed. Likewise, when the processor 210 generates the "01" pattern according to the previous frame and the current frame and executes the frame_copy program, the processor 210 accumulates the continuously appearing "00_merge" patterns and the "00_copy" patterns at the same time. If the number of "00_merge" patterns which are appear continuously and the "00_copy" patterns which are appear continuously is greater than 4, which means there are four "00_merge" patterns or "00_copy" patterns appearing continuously, the processor 210 determines that an error appeared in the video signal $S_v$ or the conversion type has changed. At this time, the processor 210 interrupts the processing mode and goes back to the detect mode for accumulating each pattern for determining the conversion type of the video signal. In other words, when no "01" pattern or "10" pattern appears within four consecutive patterns, the processor 210 interrupts the processing mode and goes back to the detect mode.

It should be noted that, when in the processing mode, the processor 210 continuously accumulates the "10" patterns and the "01" patterns, and determines the difference in the number of "10" patterns and the number of "01" patterns. If the difference in the number of "10" patterns and the number of "01" patterns is greater than a predetermined value, e.g. 1, the processor 210 determines that the video signal $S_v$ is not the conversion type detected by the detect mode, and then stops the processing mode and goes back to the detect mode for accumulating each pattern for determining the conversion type of the video signal. For example, in the embodiment, because the "10" pattern and the "01" pattern of the film source converted by the 3v2 PullDown appear alternately (shown in Table 1). Thus, when the difference in the number of "10" patterns and the number of "01" patterns is greater than 1, which means that an error appeared in the video signal $S_v$ or the conversion type has changed, the processor 210 will re-determine the conversion type of the video signal $S_v$, i.e. the processor 210 goes back to the detect mode, to avoid outputting the wrong video.

According to another embodiment, when the video signal $S_v$ is a film frame video signal converted by the 2v2 PullDown, the "10" pattern and the "01" pattern will not appear in the video signal. Thus, the processor 210 must use another way for determining the conversion type of the video signal. The cadence of the 2v2 PullDown includes 2:2, 2:2:2:4, and 6:4, etc. In the embodiment, when the processor 210 goes to the detect mode, if both the odd fields and the even fields of the current frame and the previous frame are different in a second cycle, and the odd field and the even field of the current frame are similar, the processor 210 generates a "00_2v2" pattern corresponding to the current frame. If the number of "00_2v2" patterns is greater than a predetermined value, such as 16 frames, the processor 210 executes the frame_copy program for the current frame. Specifically, in the embodiment, when the processor 210 is in the detect mode, the processor 210 accumulates the difference-points of the odd fields of two adjacent frames and the difference-points of the even fields of two adjacent frames, accumulates the difference-points within the same frame of the odd field and the even field of the same field, and obtains a ratio according to the difference-points of the odd field and the difference-points of the even field of two adjacent frames, and the difference-points of the odd field and the even field within the same frame. The processor 210 further calculates the difference value of the odd fields of two adjacent frames and the difference value of the even field of two adjacent frames, calculates the difference value of the odd field and the even field of the same frame, and obtains a ratio of the difference value of the odd field and the difference value of the even field of two adjacent frame to the difference value of the odd field and the even field within the same frame for determining whether the video signal $S_v$ is a film source converted by the 2v2 PullDown. For example, the processor 210 calculates the difference value of the pixel value of the odd fields of the previous frame and the current frame at the same position, and determines whether the difference value is greater than a predetermined value. The processor 210 accumulates the difference-points for which the difference value is greater than the predetermined value, but if the difference value is less than or equal to the predetermined value, the processor 210 does not accumulate the different-points. For each position of the odd field or the even field, the processor 210 selects the adjacent pixel values and calculates the average value. For example, in the odd field, the processor 210 selects the top pixel, bottom pixel, left pixel, and right pixel of the current point and calculates the average value. Or in the even field, the processor selects the top left pixel, the bottom left pixel, the top right pixel, and the bottom right pixel of the current point and calculates the average value. Then the processor 210 further calculates the absolute value of the difference of the average value corresponding to the same position of two adjacent frames, and adds all difference values of all positions for obtaining the difference value corresponding to the odd field/even fields of two adjacent frames. The processor 210 further calculates the absolute value of the difference of the average value corresponding to the same position of the odd field and the even field within the same frame, and adds all difference values of all positions within the same frame for obtaining the difference value corresponding to the odd field/even field of the same frame. In an embodiment, the processor 210 determines whether the number of difference-points of two frames is predetermines times, e.g. 8 times, more than the difference-points of the odd field and the even field within the same frame, and whether the ratio of the difference value of the odd field and the even field within the same frame and the difference value of two frames is less than or equal to a predetermined value, e.g. 0.25. When the number of frames meeting the conditions described above is greater than a predetermined value, e.g. 16 frames, the processor 210 determines the input video signal Sv is a film frame video signal converted by the 2v2 PullDown, and then executes the frame_copy program. It should be noted that the frame_copy is the same as described above, thus it is not described herein.

Figure 3:
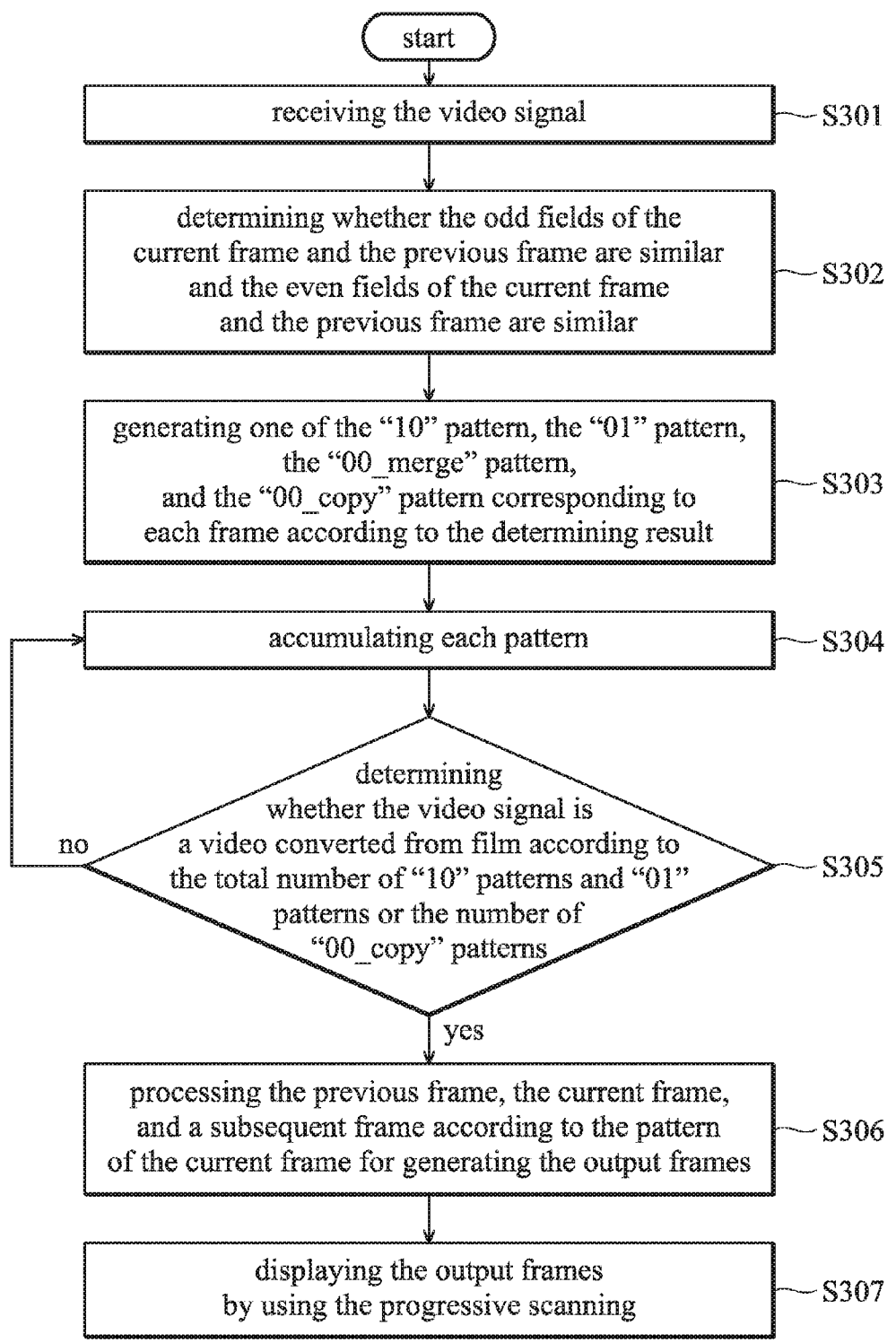
FIG. 3 is a flow chart of a method for processing a video signal in accordance with an embodiment of the invention.

FIG. 3 is a flow chart of a method for processing a video signal in accordance with an embodiment of the invention. In step S301, the processor 210 receives the video signal Sv. Each frame of the video signal Sv has an odd field and an even field. In step S302, the processor 210 determines whether the odd fields of the current frame and the previous frame are similar and the even fields of the current frame and the previous frame are similar. In step S303, the processor 210 generates one of the "10" pattern, the "01" pattern, the "00_merge" pattern, and the "00_copy" pattern corresponding to each frame according to the determining result. When the odd fields of the current frame and the previous frame are similar, and the even fields of the current frame and the previous frame are different, the processor 210 generates the "10" pattern corresponding to the current frame. When the odd fields of the current frame and the previous frame are different, and the even fields of the current frame and the previous frame are similar, the processor 210 generates the "01" pattern corresponding to the current frame. When the odd fields of the current frame and the previous frame are different and also the even fields of the current frame and the previous frame are different, and the current frame appears after a frame with the "10" pattern, the processor 210 generates the "00_merge" pattern corresponding to the current frame. When the odd fields of the current frame and the previous frame are different and also the even fields of the current frame and the previous frame are different, and the current frame appears after a frame with the "01" pattern, the processor 210 generates the "00_copy" pattern corresponding to the current frame. In step S304, the processor 210 accumulates the "10" patterns, the "01" patterns, the "00_merge" patterns, and the "00_copy" patterns in a predetermined cycle. In step S305, the processor 210 determines whether the video signal is a film frame video signal according to the total number of "10" patterns and the "01" patterns or the number of "00_copy" patterns. For example, if the total number of "10" pattern and the "01" pattern is greater than or equal to a predetermined value or the number of "00_copy" patterns is greater than another predetermined value, the method proceeds to step S306. If the total number of "10" pattern and the "01" pattern is less than the predetermined value or the number of "00_copy" patterns is less than another predetermined value, the processor 210 resets the number to zero and the method goes back to step S304 for re-accumulating each pattern. In step S306, the previous frame, the current frame, and a subsequent frame are processed by the processor 210 according to the pattern of the current frame for generating a plurality of output frames, e.g. two output frames. In the embodiment, when the pattern of the current frame is "10" pattern or "00_merge" pattern, the processor 210 executes the frame_merge program. The frame_merge program means the processor 210 generates an output frame according to the odd field of the previous frame and the odd field of the current frame, and outputs another output frame according to the even field of the current frame and the odd field of the subsequent frame. When the pattern of the current frame is "01" pattern or "00_copy" pattern, the processor 210 executes the frame_copy program. The frame_copy program means the processor 210 outputs two of the same output frames according to the odd field and the even field of the current frame. In step S307, the display module 220 displays the output frames by using progressive scanning.

Figure 4:
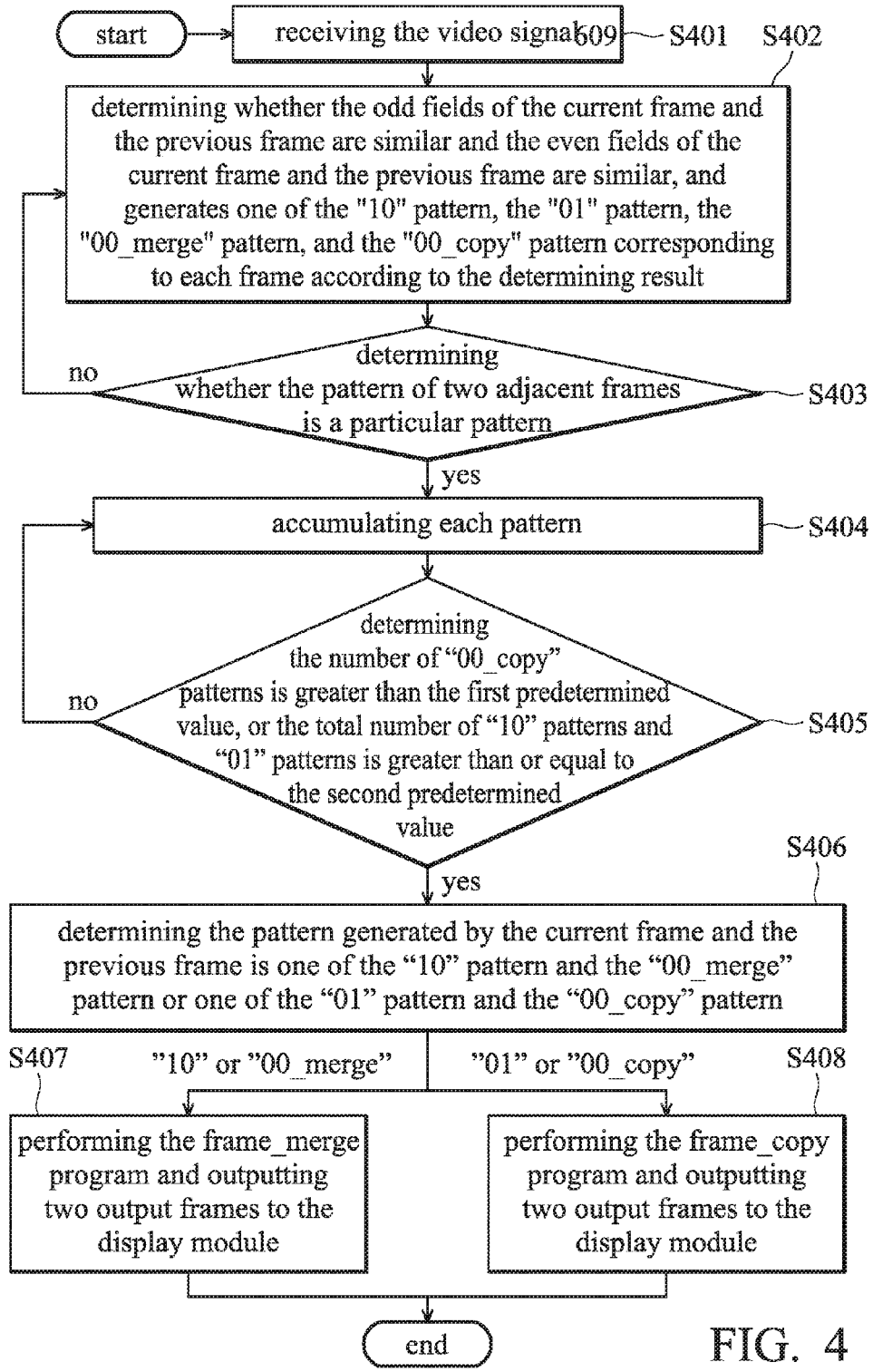
FIG. 4 is a flow chart of a method for processing a video signal in accordance with another embodiment of the invention.

FIG. 4 is a flow chart of a method for processing a video signal in accordance with another embodiment of the invention. In step S401, the processor 210 receives the video signal $S_v$. Each frame of the video signal has an odd field and an even field. In step S402, the processor 210 determines whether the odd fields of the current frame and the previous frame are similar and the even fields of the current frame and the previous frame are similar, and generates one of the "10" pattern, the "01" pattern, the "00_merge" pattern, and the "00_copy" pattern corresponding to each frame according to the determining result. In step S403, the processor 210 determines whether the pattern of two adjacent frames is a particular pattern. If the pattern is a particular pattern, the method proceeds to step S404, the processor 210 accumulates each pattern. Otherwise, if the pattern is not a particular pattern, the method goes back to step S402. In step S405, the processor 210 determines whether the number of "00_copy" patterns is greater than the first predetermined value, e.g. 2, or the total number of "10" patterns and "01" patterns is greater than or equal to the second predetermined value, e.g. 3. If one of the conditions is met, the method proceeds to S406, the processor 210 determines the pattern generated by the current frame and the previous frame is one of the "10" pattern and the "00_merge" pattern or one of the "01" pattern and the "00_copy" pattern. If the pattern is one of the "10" pattern and the "00_merge" pattern, the method proceeds to S407, the processor 210 executes the frame_merge program and outputs two output frames to the display module 220. If the pattern is one of the "01" pattern and the "00_copy" pattern, the method proceeds to S408, the processor 210 executes the frame_copy program and outputs two output frames to the display module 220. It should be noted that the features of the odd field, the even field, the pattern are the same as the embodiments of the display device, thus it is not described herein.

As described above, the display device and the method for processing video signal of the present invention determines the type of the video signal by appropriately accumulating different patterns generated by two adjacent frames, and processes the reverse PullDown according to the type of the video signal. In addition to the complicated steps for building the table being simplified, the misjudgments caused by an incomplete table or an error in the video signal can also be avoided, to simply and correctly determine and reverse the video, so that a better video can be provided to users.

It will be apparent to those skilled in the art that various modifications and variations can be made to the structure disclosed without departing from the scope or spirit of the invention. In view of the foregoing, it is intended that the present invention covers modifications and variations of this invention, provided they fall within the scope of the following claims and their equivalents.

What is claimed is:

1. A display device, configured to receive a video signal, wherein the video signal comprises a plurality of frames, and each frame has an odd field and an even field, the display device comprising:
   a processor, configured to perform the following steps:
      respectively determining whether the odd fields of each current frame and its previous frame are similar and the even fields of each current frame and its previous frame are similar;
      generating one of a plurality of patterns corresponding to each current frame according to a determining result by determining whether the odd fields of each current frame and its previous frame are similar and the even fields of each current frame and its previous frame are similar, wherein the patterns at least comprise a first pattern, a second pattern, a third pattern, and a fourth pattern;
      respectively accumulating the first patterns, the second patterns, the third patterns, and the fourth patterns in a first cycle;
      determining whether the video signal is a video converted from film according to a number of the first patterns and the second patterns, or a number of the fourth patterns;
      generating a plurality of output frames by processing the previous frame, the current frame and a subsequent frame according to the pattern of each current frame when the video signal is a video converted from film; and
   a display module, configured to display the output frames by progressive scanning.

2. The display device as claimed in claim 1, wherein:
   the processor generates the first pattern corresponding to the current frame when the odd fields are similar and the even fields are different;
   the processor generates the second pattern corresponding to the current frame when the odd fields are different and the even fields are similar;
   the processor generates the third pattern corresponding to the current frame when the odd fields and the even fields are both different, and the current frame appears after a frame corresponding to the first pattern; and
   the processor generates the fourth pattern corresponding to the current frame when the odd fields and the even fields are both different, and the current frame appears after a frame corresponding to the second pattern.

3. The display device as claimed in claim 1, wherein when a total number of the first patterns and the second patterns is greater than or equal to a first predetermined value in the first cycle, the processor determines that the video signal is the video converted from film.

4. The display device as claimed in claim 1, wherein when the number of the fourth patterns is greater than a second predetermined value in the first cycle, the processor determines the video signal is the video converted from film.

5. The display device as claimed in claim 1, wherein when the pattern is the first pattern or the third pattern, the processor executes a first processing program, the first processing program means the processor generates a first frame of the output frames according to the even field of the previous frame and the odd field of the current frame, and generates a second frame of the output frames according to the even field of the current frame and the odd field of the subsequent frame.

6. The display device as claimed in claim 1, wherein when the pattern is the second pattern or the fourth pattern, the processor executes a second processing program, the processing program means the processor generates a first frame and a second frame of the output frames according to the odd field and the even field of the current frame.

7. The display device as claimed in claim 1, wherein when a total number of the first patterns and the second patterns is greater than a first threshold, or the number of the fourth patterns is greater than a second threshold, the processor determines that the video signal is the video converted from film.

8. The display device as claimed in claim 1, wherein when a total number of the first patterns and the second patterns is less than or equal to a first threshold, and the number of the fourth patterns is less than or equal to the second threshold, the processor re-accumulates the first patterns, the second patterns, the third patterns and the fourth patterns.

9. The display device as claimed in claim 1, wherein when the patterns generated by the current frame do not comprise the first pattern or the second pattern for N consecutive patterns, the processor re-accumulates the first patterns, the second patterns, the third patterns and the fourth patterns.

10. The display device as claimed in claim 1, wherein the processor further performs the following steps:
when in a second cycle that the odd fields of the current frame and the previous frame are different, the even fields of the current frame and the previous frame are also different, and the odd field and the even field of the current frame are similar, the processor generates a fifth pattern corresponding to the current frame; and
when in the second cycle that a number of the fifth patterns is greater than a third predetermined value, the processor executes a second processing program, the second processing program means the processor generates a first frame and a second frame of the output frames according to the odd field and the even field of the current frame.

11. A method for processing a video signal, adapted to a display device, comprising:
generating a video signal, wherein the video signal comprises a plurality of frames, and each frame has an odd field and an even field;
respectively determining whether the odd fields of each current frame and its previous frame are similar and the even fields of each current frame and its previous frame are similar;
generating one of a plurality of patterns corresponding to each current frame according to a determining result by determining whether the odd fields of each current frame and its previous frame are similar and the even fields of each current frame and its previous frame are similar, wherein the patterns at least comprise a first pattern, a second pattern, a third pattern, and a fourth pattern;
respectively accumulating the first patterns, the second patterns, the third patterns, and the fourth patterns in a first cycle;
determining whether the video signal is a video converted from film according to a number of the first patterns and the second patterns, or a number of the fourth patterns;
generating a plurality of output frames by processing the previous frame, the current frame and a subsequent frame according to the pattern of each current frame when the video signal is a video converted from film; and
displaying the output frames by progressive scanning.

12. The method as claimed in claim 11, wherein the step for generating one of a plurality of patterns corresponding to each current frame further comprises:
generating the first pattern corresponding to the current frame when the odd fields are similar and the even fields are different;
generating the second pattern corresponding to the current frame when the odd fields are different and the even fields are similar;
generating the third pattern corresponding to the current frame when the odd fields and the even fields are both different, and the current frame appears after a frame corresponding to the first pattern; and
generating the fourth pattern corresponding to the current frame when the odd fields and the even fields are both different, and the current frame appears after a frame corresponding to the second pattern.

13. The method as claimed in claim 11, wherein when a total number of the first patterns and the second patterns is greater than or equal to a first predetermined value in the first cycle, determining that the video signal is the video converted from film.

14. The method as claimed in claim 11, wherein when the number of the fourth patterns is greater than a second predetermined value in the first cycle, the processor determines the video signal is the video converted from film.

15. The method as claimed in claim 11, wherein the step for generating a plurality of output frames by processing the previous frame, the current frame and a subsequent frame further comprises:
when the pattern is the first pattern or the third pattern, executing a first processing program, the first processing program means a first frame of the output frames is generated according to the even field of the previous frame and the odd field of the current frame, and a second frame of the output frames is generated according to the even field of the current frame and the odd field of the subsequent frame.

16. The method as claimed in claim 11, wherein the step for generating a plurality of output frames by processing the previous frame, the current frame and a subsequent frame further comprises:
when the pattern is the second pattern or the fourth pattern, executing a second processing program, the processing program means a first frame and a second frame of the output frames are generated according to the odd field and the even field of the current frame.

17. The method as claimed in claim 11, wherein when a total number of the first patterns and the second patterns is greater than a first threshold, or the number of the fourth patterns is greater than a second threshold, determining that the video signal is the video converted from film.

18. The method as claimed in claim 11, wherein when a total number of the first patterns and the second patterns is less than or equal to a first threshold, and the number of the fourth patterns is less than or equal to the second threshold, re-accumulating the first patterns, the second patterns, the third patterns and the fourth patterns.

19. The method as claimed in claim 11, wherein when the patterns generated by the current frame do not comprise the first pattern or the second pattern for N consecutive patterns, re-accumulating the first patterns, the second patterns, the third patterns and the fourth patterns.

20. The method as claimed in claim 11, wherein the steps further comprise:
when in a second cycle that the odd fields of the current frame and the previous frame are different, the even fields of the current frame and the previous frame are also different, and the odd field and the even field of the current frame are similar, generating a fifth pattern corresponding to the current frame; and
when in the second cycle that a number of fifth patterns is greater than a third predetermined value, executing a second processing program, the second processing program means a first frame and a second frame of the output frames are generated according to the odd field and the even field of the current frame.

* * * * *